Figure 1:
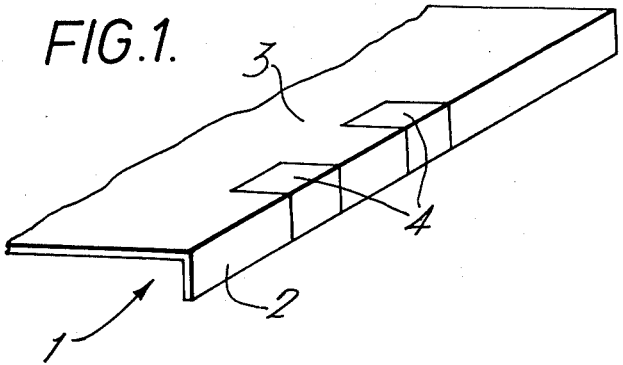

United States Patent
Watts et al.

[11] 3,916,789
[45] Nov. 4, 1975

[54] PRINTING

[75] Inventors: Peter Edward Watts, Reading; Ernest Michael Holden, Slough, both of England

[73] Assignee: Vickers Limited, London, England

[22] Filed: Sept. 11, 1973

[21] Appl. No.: 396,244

[30] Foreign Application Priority Data
June 22, 1973 United Kingdom............ 29917/73
Sept. 12, 1972 United Kingdom............ 42390/72

[52] U.S. Cl. .................. 101/148; 101/350; 324/61
[51] Int. Cl.² .................. B41F 25/00; B41F 31/00
[58] Field of Search .......... 101/426, 451, 350, 148, 101/142; 324/61, 65 P, 65 R; 250/218

[56] References Cited
UNITED STATES PATENTS

| | | | |
|---|---|---|---|
| 3,191,528 | 6/1965 | Jorgensen | 101/148 |
| 3,227,951 | 1/1966 | Dykaar | 324/61 |
| 3,234,871 | 2/1966 | Ostwald | 101/142 |
| 3,412,677 | 11/1968 | Kantor | 101/148 |
| 3,439,175 | 4/1969 | Kammüller | 250/218 |
| 3,499,383 | 3/1970 | Southam | 101/148 |
| 3,584,579 | 6/1971 | Rothenberg | 101/350 |
| 3,730,086 | 5/1973 | Dauterman | 101/148 |

*Primary Examiner*—Stephen C. Pellegrino
*Attorney, Agent, or Firm*—Nichol M. Sandoe

[57] ABSTRACT

During lithographic printing, a measure of the amount of water present on the water receptive areas of the printing plate is obtained by determining the amount of water present on the surface of a monitoring zone. The monitoring zone comprises electrodes spaced by electrically insulating material and the amount of water present on the surface of the zone is determined by measuring the electrical resistance between the electrodes. The electrical resistance may be measured using a phase sensitive detector and the amount of water subsequently applied to the printing plate may be controlled in dependence on the amount determined as being present.

2 Claims, 9 Drawing Figures

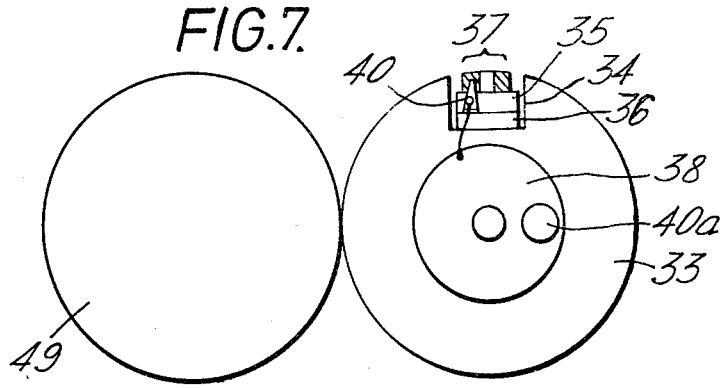
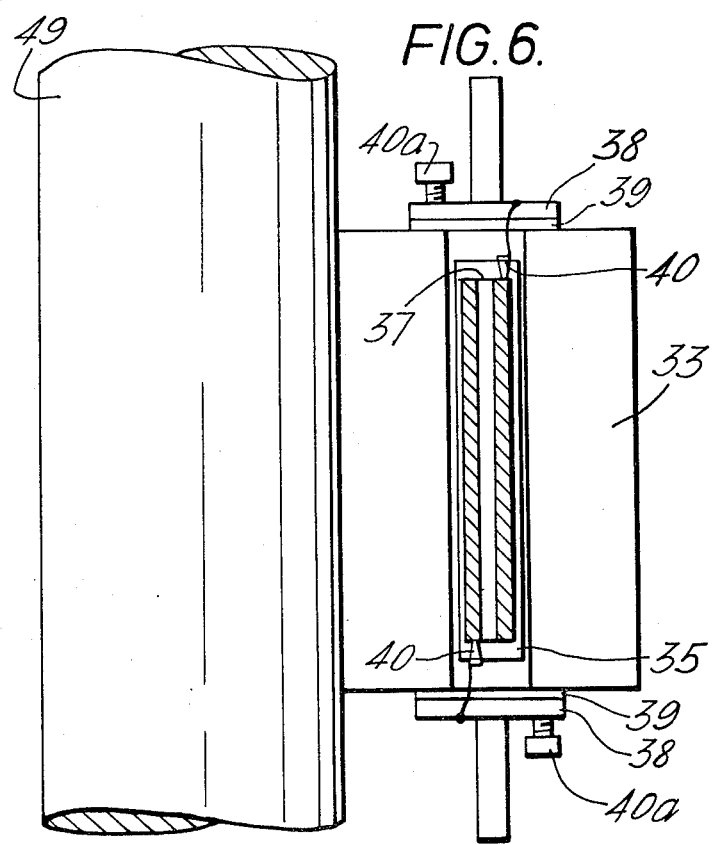

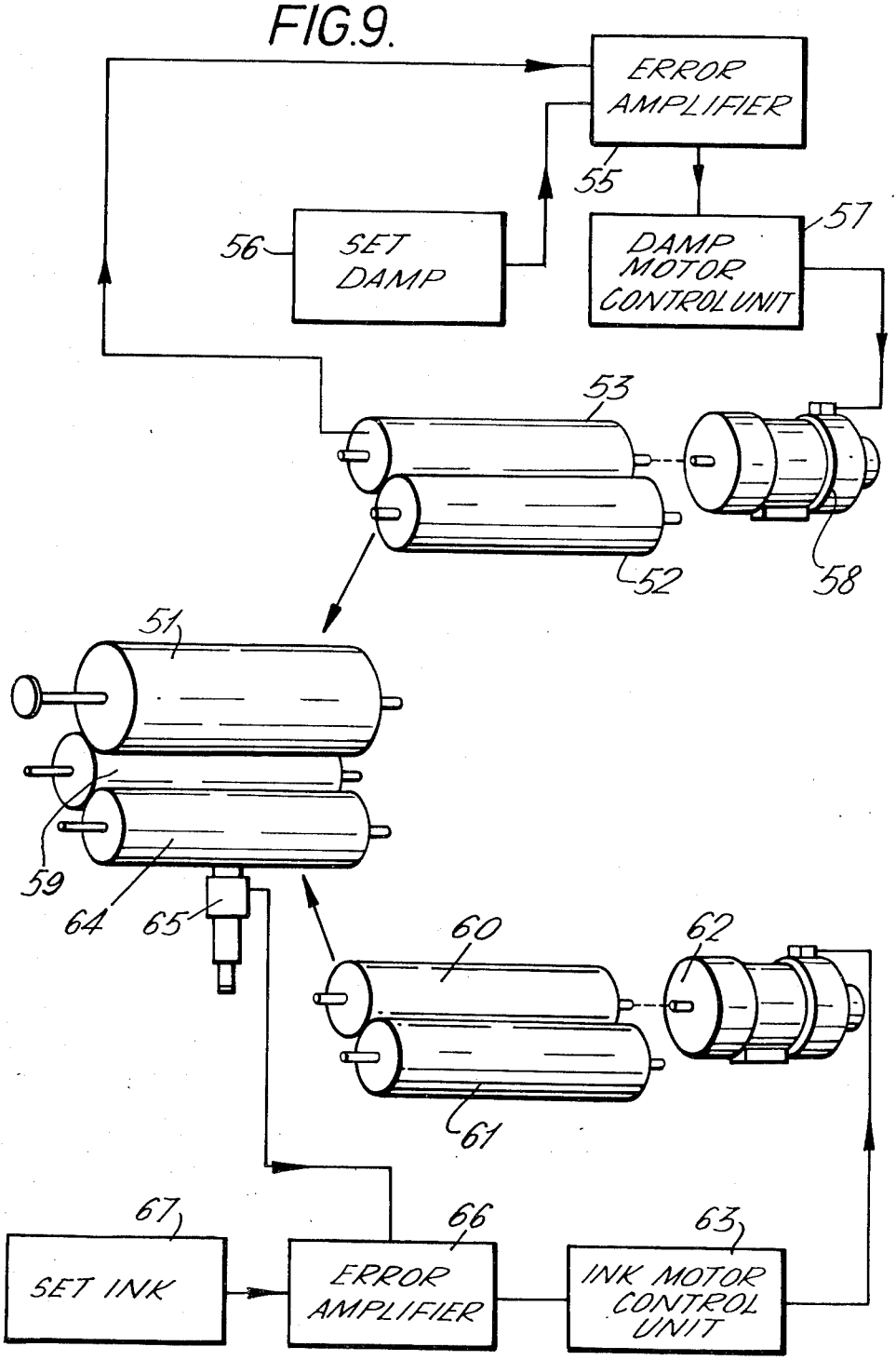

PRINTING

This invention relates to the determination of the amount of water present on a surface during lithographic printing.

The electrical resistance of a film of water on a surface of electrically insulating material is dependent upon the thickness of the water film. It is an object of this invention to utilise this in determining the thickness of water films on printing plates during lithographic printing.

According to one aspect of the present invention there is provided a method of lithographic printing which comprises applying water to the water-receptive areas of the surface of a lithographic printing plate, applying ink to the ink-receptive areas of the surface of the lithographic printing plate, providing a pair of electrodes spaced by electrically insulating material in the surface of a monitoring zone which is located so as to receive water during printing, and determining the amount of water present on said electrically insulating material as a function of the electrical resistance between the electrodes.

According to another aspect of the present invention there is provided a lithographic printing machine comprising a printing roller for carrying a lithographic printing plate, a means of applying water to water-receptive areas of the surface of the lithographic printing plate, a means of applying ink to ink-receptive areas of the surface of the lithographic printing plate, and a monitoring zone in the form of a surface in which is mounted a pair of electrodes spaced by electrically insulating material, said monitoring zone being located so as to receive water from the water applying means and said pair of electrodes constituting a part of a damp measuring device which additionally comprises a means of measuring the electrical resistance between the electrodes.

The electrodes of the monitoring zone are formed of hydrophilic electrically conductive material, e.g. aluminium and the electrically insulating material of the monitoring zone is a hydrophilic material such as, for example, alumina or, more preferably, glass.

When carrying out the present invention, the resistance of the water film on the electrically insulating material should be measured with A.C. since this avoids polarization effects and changes in the electrodes due to electrolysis. The resulting signal will be a voltage or current at the frequency of the applied A.C. It is normally more convenient if the output from the monitoring zone is in the form of a D.C. signal. One way of obtaining this is to simply rectify the A.C. Signal. Another way is to use a Phase Sensitive Detector (P.S.D.). The P.S.D. has the advantage that it gives a D.C. output proportional to the A.C. input with a bandwidth about the A.C. frequency approximately equal to the inverse of the time constant at the D.C. output stage.

A simple rectifier gives a D.C. output which includes contributions from all frequencies from zero upwards. Increasing the time constant after the rectifier does not eliminate the contribution to the signal from a broad band of noise. Increasing this time constant in the case of a P.S.D., however, decreases the noise contributing to the signal to a bandwidth approximately equal to the inverse of this time constant.

During printing in accordance with the present invention, the electrodes come periodically into contact with very wet rollers. This contact gives rise to a large transient increase in the signal level. This is in conflict with the steady reading of water level which is desired and can be reduced by increasing the time constant of the output circuit to average out this large transient.

An additional advantage of the P.S.D. when used in bridge circuits is that it gives readings of opposite sign either side of the null point.

During printing, frequent changes occur in the conductivity of aqueous fountain solutions applied to the water-receptive areas of the plate as the amount and nature of the additives in the fountain solution are changed. The effect of such conductivity variations can be eliminated by using a reference cell comprising spaced electrodes immersed in, as electrolyte, the fountain solution in the machine damp tray as one arm of a bridge circuit and effectively to compare the resistance between the electrodes and the resistance of the reference cell. It is also possible to eliminate the bridge circuit and have the reference cell merely in series with the electrodes of the monitoring zone. If a constant voltage A.C. source is then applied across the two the voltage will divide between the two depending only on their relative resistances and not on their absolute resistance. Again, the resistance between the electrodes is effectively compared with that of the reference cell.

In one embodiment, the monitoring zone is located in a water-receptive non-printing area of the printing plate surface. Thus, electrodes of suitable material, e.g. aluminium are mounted on a non-printing area of the plate so that they are spaced apart by hydrophilic electrically insulating material. If appropriate the insulating material may be constituted by the surface of the non-printing area e.g. in the case where the non-printing area is formed of anodised aluminium. In accordance with this embodiment, the measured electrical resistance gives a direct indication of the amount of water present on the water-receptive areas of the plate.

In an alternative embodiment the monitoring zone is located in a surface which is other than the surface of the printing plate and which carries an amount of water related to the amount of water present on the water-receptive areas of the surface of the printing plate as described and claimed in our copending U.S. Pat. application Ser. No. 396,245. In this case the monitoring zone is in a surface which is not a part of the printing plate itself. This obviates the difficulties which would be encountered if attempts were made to measure the amount of water present on a printing plate consisting, to a large extent, of ink-receptive areas rather than water-receptive areas. In accordance with this embodiment the measured electrical resistance gives an indirect indication of the amount of water present on the water-receptive areas of the plate.

In a first form of this alternative embodiment, the monitoring zone is located in the surface of an auxiliary roller which contacts one of the rollers of the damping train of the lithographic printing machine. The auxiliary roller has a hydrophilic surface which includes a pair of electrodes spaced apart by hydrophilic electrically insulating material and which, in use, receives water from the damping train. The amount of water on the auxiliary roller and also the amount of water present on the printing plate on the printing roller of the machine are both dependent on the amount of water being applied by the damping train and hence the amount of water on the auxiliary roller is related to that present on the printing plate surface. By measuring the electrical resistance between the electrodes, e.g. by means of an AC bridge, the thickness of the water film on the printing plate can be determined.

In a second form of this alternative embodiment of the invention, the monitoring zone is located in the surface of one of the rollers, preferably the penultimate roller, of the damping train of the printing machine. Thus, this roller is provided in its surface, with a pair of electrodes spaced apart by electrically insulating material. In the case where only one final moleton roller is present, the damp level on the penultimate roller coming back from the final moleton roller will be similar to the damp level being applied to the printing plate by the final moleton roller. Thus, the amount of water present on this roller is related to the amount present on the printing plate.

This embodiment is particularly relevant for printing machines including only one final moleton roller in cases where the level of damp present on the surface contacting the moleton depends primarily on the amount of water stored within the moleton and to a very much lesser degree on the initial condition of the surfaces before they enter the nip with the moleton. In the case where there are two final moleton rollers, the damp level returning on the penultimate roller will be less than the final damp level on the printing plate. Nevertheless, this damp level will be a measure of the damp level on the plate.

In a third form of this alternative embodiment of the invention, the monitoring zone is constituted by a control pad located in the gap formed when the printing plate is secured to the printing roller of the lithographic printing machine. In this location, the control pad does not fall within the normal printing zones of the machine but receives water from the water applying means for the printing plate in the same manner as does the printing plate. The control pad includes in its surface a pair of electrodes spaced apart by electrically insulating material. The pad rotates with the printing roller and the water film on the pad is formed on each contact with the water applying means and thus the amount of water present on the pad depends upon the amount of water present on the water applying means which is also generating the water film on the printing plate surface. Thus, the amount of water present on the control pad is related to the amount of water present on the printing surface since they are each dependent upon the amount of water present on the water applying means. Hence the electrical resistance between the electrodes gives a measure of the amount of water present on the printing plate.

The control pad constitutes a suitable standard surface having known properties and characteristics and thus variations in the surface of different printing plates do not introduce errors.

Preferably the control pad is readily detachable from the printing roller so that it can more easily be replaced in the event that its wetting properties become changed by prolonged use or exposure to the atmosphere. Thus, the control pad may be secured, e.g. by screws, to a part of the printing roller provided with terminals which make electrical contact with the electrodes of the pad.

In use, the amount of water present on the surface of the control pad alone can be measured or, where practical, the amount of water present on both the control pad and also on the non-printing areas of the plate can be measured and compared. In the former case, the construction and operation of the damp monitoring system is simplified. In the case where both the control pad and the non-printing areas of the plate are monitored, this is of particular use when printing plates of different materials are used such as paper plates or plates made of stainless steel or chromium.

The amount of water being applied to the surface of the printing plate during printing can be regulated in dependence upon the amount actually present as determined in accordance with the present invention. This can be effected manually or, alternatively, it can be effected automatically using a closed loop control system. Thus in a particularly preferred embodiment of the method of the present invention, the amount of water subsequently applied to the water-receptive areas is controlled in dependence upon the electrical resistance between the electrodes of the monitoring zone so that a desired amount of water is present on the water-receptive areas during printing. Similarly, the printing machine of the present invention preferably includes a means of controlling the water applying means in dependence on the measured electrical resistance.

If desired, the present invention may be used in conjunction with a system for measuring the amount of ink present on the printing plate and for controlling the amount of ink applied to the printing plate in dependence on the measured amount as described in our U.S. Pat. application Ser. No. 275,109. In this way, the application of both water and ink can be automatically controlled.

The term "printing plate" is used herein to mean any lithographic printing master carrying an image which is to be reproduced by lithographic printing and the term "water" is used herein to include aqueous fountain solutions.

Figure 2:
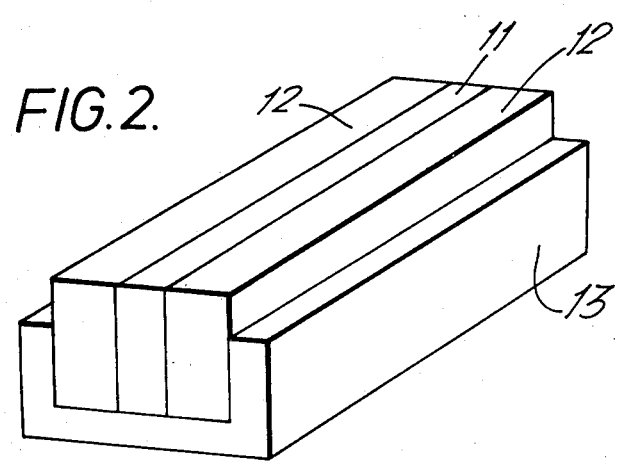
Figure 3:
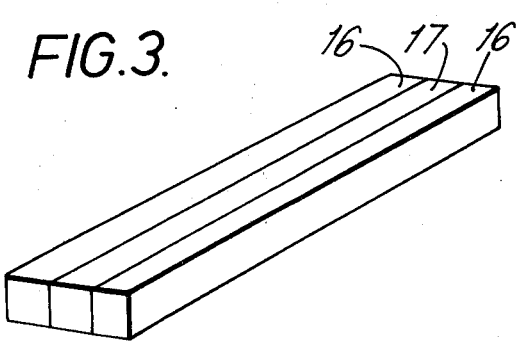
Figure 4:
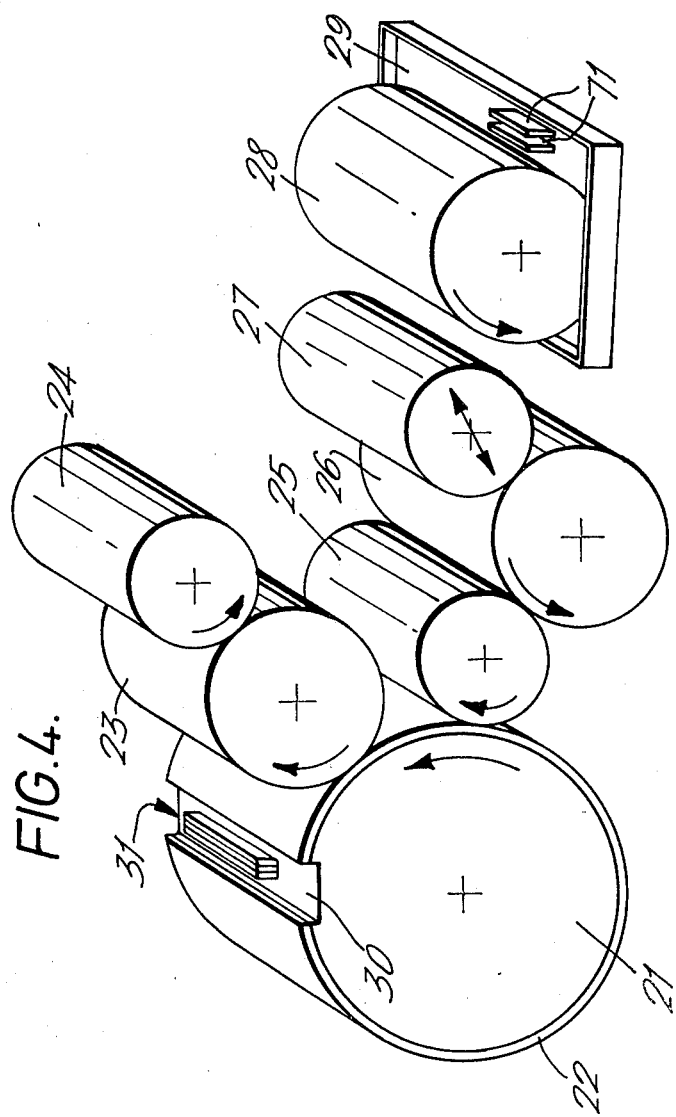
Figure 5:
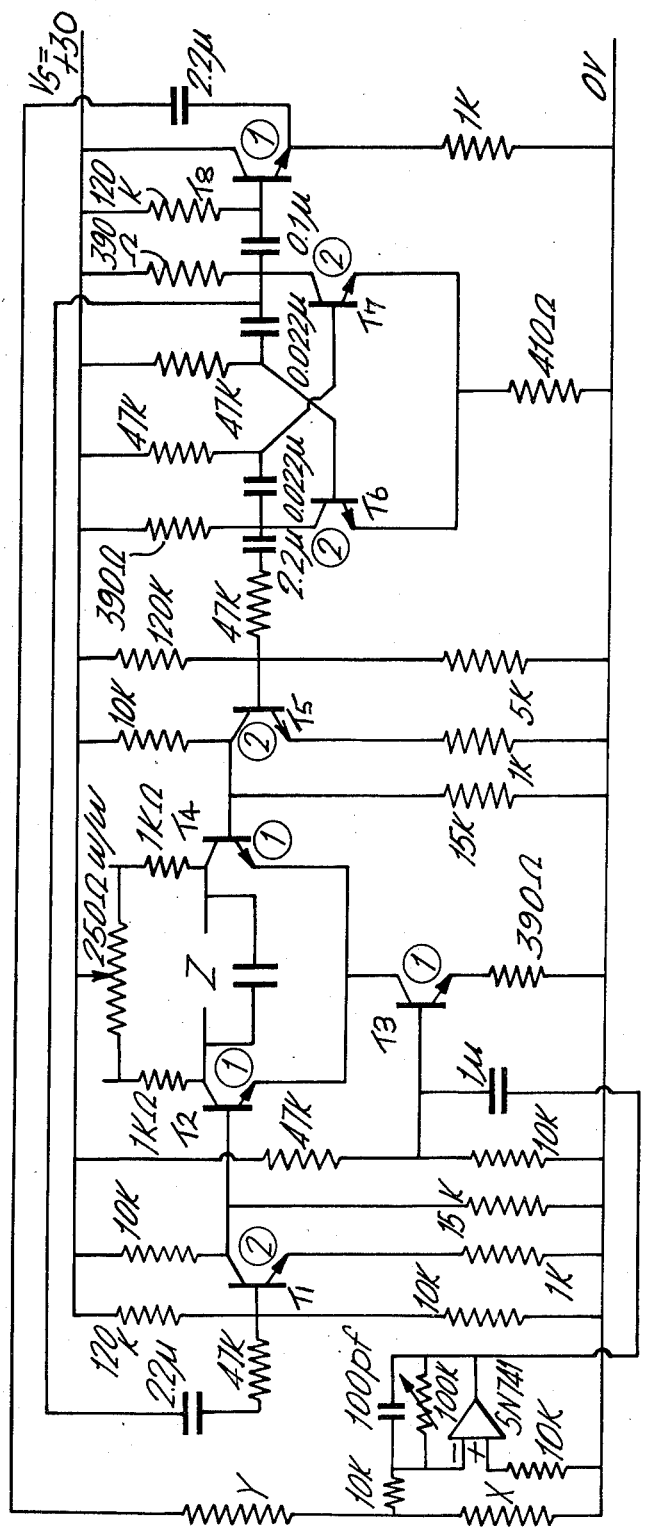
Figure 8:
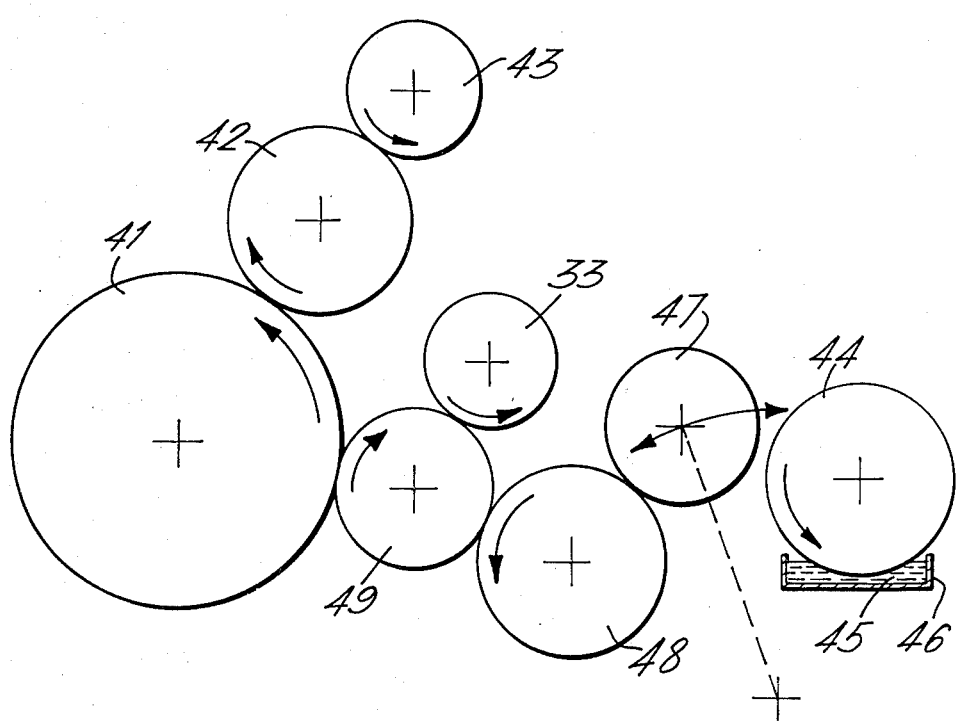

For a better understanding of the invention, and to show how the same may be carried into effect, reference will now be made by way of example to the accompanying drawings, in which:

FIG. 1 is a perspective view of a lithographic printing plate including a monitoring zone for use in accordance with one embodiment of the present invention, FIG. 2 is a perspective view of a control pad for use in accordance with a second embodiment of the present invention, FIG. 3 is a perspective view of another control pad for use in accordance with the second embodiment of the present invention, FIG. 4 is a perspective view of a part of a printing machine in accordance with the present invention and incorporating a control pad as shown in FIG. 2 or 3, FIG. 5 is the electric circuit of the damp measuring device of the printing machine shown in FIG. 4, FIG. 6 is a plan view of a part of another embodiment of a printing machine in accordance with the present invention, FIG. 7 is an end view of the part shown in FIG. 6, FIG. 8 is a schematic representation of a printing machine incorporating the part shown in FIGS. 6 and 7, and FIG. 9 is a schematic representation of a further embodiment of a printing machine in accordance with the present invention and incorporating a closed loop control system.

Referring to FIG. 1, there is shown an anodised aluminium lithographic printing plate 1 having an edge 2 which has been bent over prior to the plate being mounted on a printing roller. A part of the water-receptive non-printing area 3 of the surface of the plate constitutes a monitoring zone and is provided with a pair of electrodes 4 formed of electrically conductive material e.g. vacuum evaporated aluminium and forming a part of a damp measuring device. The electrodes are spaced apart by the hydrophilic electrically insulating anodised aluminium constituting the water-receptive areas of the plate surface and extend on to the edge 2. The damp measuring device additionally includes a means of measuring the electrical resistance between the electrodes 4 and, in use, the plate 1 is mounted on a printing roller so that the electrodes 4 on the edge 2 contact terminals provided on the roller, the terminals being operably connected to the means of measuring the electrical resistance via for example slip rings and brushes. In use, water is applied to the water-receptive areas 3 of the plate whereby a film of water is formed on the anodised aluminium and the electrodes 4. The electrical resistance between the electrodes 4 is a function of the thickness of the water film. Hence the electrical resistance gives a measure of the amount of water present on the anodised aluminium and hence a measure of the amount of water present on the water-receptive areas of the plate surface.

Referring to FIG. 2, there is shown a control pad constituting a monitoring zone in accordance with the present invention. The control pad comprises aluminium electrodes 11 spaced apart by a glass surface 12. The electrodes 11 form part of a damp measuring device. The pad is produced by adhering a glass sheet having flat faces between two aluminium sheets also having flat faces. The top edge of the sandwich structure is then ground so that it presents a planar surface in which are located a pair of aluminium electrodes spaced by the electrically insulating glass. If desired, and as shown, the assembly may be cast in a holder 13. In use, the control pad is mounted in the gutter of a printing roller as described hereinafter.

Referring to FIG. 3, there is shown another control pad. This also consists of aluminium electrodes 16 spaced apart by a glass surface 17, and, as before, the electrodes form part of a damp measuring device. In this case, however, the pad is produced by applying masking tape to a sheet of glass so that the tape extends around the central part of the sheet only, grit blasting the sheet, and then applying a thin layer of aluminium by flame spraying or vacuum deposition. The tape is then removed to reveal the underlying glass surface which constitutes electrically insulating material separating a pair of electrodes constituted by the flame sprayed or vacuum deposited aluminium. In use, the control pad is mounted in the gutter of a printing roller as hereinafter described.

Referring to FIG. 4, there is shown a part of a printing machine in accordance with the present invention. The printing machine comprises a printing roller 21 carrying an anodised aluminium lithographic printing plate 22 and an inking means to supply ink to the printing plate 22 in operation. The inking means is represented schematically by an inking roller 23 and an ink feed roller 24. The printing machine also includes a means of applying water to the plate 22 comprising a damping roller 25, a geared distributor roller 26, a reciprocating ductor feed roller 27 and a fountain roller 28 which is partially immersed in an aqueous fountain solution 29 contained in a reservoir. A pair of electrodes 71 is immersed in the fountain solution to form a reference cell constituting a further part of the damp measuring device. The rollers rotate in the direction indicated by the arrows. The printing machine also includes a means of introducing paper or the like to be printed by the printing plate but this is quite conventional and hence is not shown.

The printing plate 22 is mounted on the roller 21 so that a gap 30 is formed between the ends of the plate. Located within the gap 30 is a replaceable control pad 31, having a surface which includes a pair of electrodes spaced by electrically insulating material. Thus, the pad 31 may be of the type shown in FIG. 2 or 3 in which case the electrodes of the pad 31 are formed of aluminium and the electrically insulating material is glass. The pad 31 is mounted on the roller so that its surface and the surface of the plate 22 are equally wetted in use by the damping roller 25. Located within the gap 30 are two terminals (not shown) which make electrical contact with the electrodes of the pad 31 when it is mounted in the gap. The terminals are electrically connected to a means of measuring electrical resistance comprising a further part of the damp measuring device by means of a system of brushes and slip rings which is not shown, but which is essentially similar to the system illustrated in FIGS. 6 and 7. The electrical circuit of the damp measuring device is shown in FIG. 5.

Referring to FIG. 5, the damp measuring device essentially comprises a phase-sensitive detector and a means of applying a reference voltage thereto. In the circuit, reference 1 denotes a BFY 51 transistor, reference 2 denotes a BC 107 transistor, X represents the resistance of the reference cell, and Y represents the resistance between the electrodes of the monitoring zone. The output from the circuit at Z is connected to a suitable recording or display system (not shown) such as a pen recorder and/or to a servo or other system (not shown) for regulating the amount of water applied by the damping roller 25 to the plate 22. The circuit is a modification of a circuit of Faulkner and Harding appearing in an article in the Journal of Scientific Instruments 1966, volume 43, pages 97 to 99. Other phase-sensitive detector circuits such as those described in the papers referred to in the aforementioned article may be used.

In the circuit shown, T6, T7 and the associated components form a conventional astable multivibrator. This multivibrator provides a square wave output which is buffered by the emitter follower stage T8. This square wave is fed across the series arrangement of resistances X and Y and is also used direct from the multivibrator as a reference signal with the opposite phase outputs from T6 and T7 going to the bases of the two transistors T1 and T5. T1 and T5 amplify the square wave and this is fed to the differential arrangement of transistors $T_2$ and $T_4$. The square wave current applied to the bases of $T_2$ and $T_4$ switches these transistors on and off alternately thereby switching the current passing through $T_3$ alternately through $T_{2\ and\ T_4}$. The magnitude of the switched current is determined by the input signal from X amplified by the 741 integrated circuit and then fed into the base of $T_3$. The output from the whole PSD circuit is taken across the collector resistances of $T_2$ and $T_4$.

A zero offset is available at the output by way of the 250ΩW/W potentiometer in the collector connections of $T_2$ and $T_4$. A signal gain control is provided by the 100K feedback potentiometer on the 741 integrated circuit.

If the input signal contains a component at the same frequency as the switching reference signal and also in phase with it then each time this input component is of one polarity it will be switched to one of $T_2$ and $T_4$ and when of the opposite polarity the switching is also reversed. In this way a D.C. output is obtained between the collector resistances of $T_2$ and $T_4$ depending on the presence of a component at the reference frequency. Noise signals and signals at frequencies other than that of the reference source will give no D.C. output contribution when averaged over many cycles since the phase relationship between the signal and switching reference is not maintained.

The nature of the resistance monitor is such that it represents a high impedance unscreened electrical source operating, quite often, in regions of considerable electrical noise (e.g. near motors, solenoids and relays). Because of this it is desirable that the effects of such electrical noise on the output signal should be minimised. As described previously the PSD gives a high degree of immunity from such noise signals because of its phase sensitivity. In effect the PSD circuit carries out a Fourier integral of the input and reference signals.

In use of the machine, the ink-applying means inks the wetted printing plate 22 in conventional manner. The water-applying means applies water to the non-printing areas of the printing plate 22 and to the pad 31 located in the gutter of the printing roller 21. The amount of water applied to the non-printing areas of the printing plate 22 and the amount of water applied to the pad 31 depend on the amount of water present on the damping roller 25 and hence the non-printing areas of the printing plate 22 and the pad 31 receive substantially equal amounts of water per unit area. The electrical resistance across the electrodes of the pad 31 is dependent upon the amount of water present on the insulating surface between the electrodes. Thus, the electrical resistance gives a measure of the amount of water on the insulating surface and hence of the amount of water on the non-printing areas of the plate 22. The machine is calibrated before commencing a printing run in order to determine the limits which are commensurate with flooding of the plate (i.e. too much water present) and scumming (i.e. too little water present).

In accordance with this embodiment of the invention, the control pad 31 can be made very economically. Thus it can be discarded and replaced by a fresh pad if its wetting properties should deteriorate after a long period of use or exposure to the atmosphere.

In the case where the monitoring zone is constituted by a part of the water-receptive area of the surface of the printing plate as shown in FIG. 1 instead of by a control pad mounted in the gap, the electrodes 4 are effectively connected to the means of measuring electrical resistance so that Y (FIG. 5) represents the resistance between these electrodes. The remainder of the machine is constructed, and the machine is operated, in a manner analogous to that described with reference to FIGS. 4 and 5.

As indicated above, the machine may include a means of automatically regulating the amount of water to be applied to the water-receptive non-printing areas of the plate by the water applying means in dependence on the amount of water already present on the water-receptive areas as determined by the electrical resistance between the electrodes of the monitoring zone. This may be effected by automatically stopping and starting a servo motor (not shown) geared to the feed roller 27 by means of a signal which is dependent upon the measured electrical resistance.

Referring to FIGS. 6 and 7, there is shown a part of a printing machine comprising an auxiliary roller 33 mounted in a yoke (not shown) so that it can run in contact with one of the rollers 49 of the train of damping rollers of the machine. The roller 33 is provided with a slot 34 parallel to the axis of the roller. A block 35 of wear resistant electrically insulating material such as that known under the trade designation Tufnol is located in the slot on a rubber mounting 36. A pad 37 comprising a pair of electrodes spaced by electrically insulating material is affixed to the block 35. The pad 37 may be as described in FIG. 2 or 3 and is so arranged that it constitutes, in the surface of the auxiliary roller 33, a monitoring zone comprising electrodes spaced by electrically insulating material. A slip ring or slipper plate 38 mounted on an electrically insulating disc 39 (e.g. formed of Tufnol) is provided at each end of the roller 33. One of the rings or plates 38 is electrically connected to one of the electrodes by a terminal in the form of a spring contact 40, and the other of the rings or plates is similarly electrically connected to the other of the electrodes. A fixed brush 40a runs on each ring or plate 38.

FIG. 8 shows the auxiliary roller 33 arranged in a printing machine. The printing machine includes a printing roller 41, adapted to carry a printing plate (not shown). A means of applying ink to the printing plate is provided. The ink applying means is represented schematically by an inking roller 42 and an ink feed roller 43. A water applying means is provided comprising a fountain roller 44 partially immersed in aqueous fountain solution 45 held in a reservoir 46, a reciprocating ductor roller 47 to feed fountain solution from the fountain roller 44 to a geared distributor roller 48, and the plate damping roller 49 to transfer fountain solution from the geared distributor roller 48 to the printing plate on the printing roller 41. The auxiliary roller 33 is driven by the damping roller 49 and the direction of rotation of the rollers is as indicated by the arrows.

In use, the amount of water present in the auxiliary roller 33 and the amount of water present on the printing plate on the printing roller 41 are both dependent upon the amount of water present on the damping roller 49 and are related. The electrical resistance between the electrodes of the monitoring zone of roller 33 is dependent upon the amount of water present as a film on the insulating material and thus the electrical resistance gives a measure of the amount of water present on the roller 33 and hence on the printing plate.

The electrodes form a part of a damp measuring device which additionally includes a means of measuring the resistance between the electrodes. The device may be of the type shown in FIG. 5 in which case Y represents the resistance between the electrodes mounted in the surface of the auxiliary rollers 33.

This embodiment is particularly useful in cases where it is difficult to provide a control pad in the gutter of the printing roller because, for example, of lack of space or difficulty in fitting slip rings or slipper plates to the printing roller. Further, in this embodiment there is no possibility of the electrodes being contaminated with ink.

Referring now to FIG. 9, there is shown a printing machine comprising a driven printing roller 51 carrying a printing plate (not shown). A means is provided to apply water to the printing plate on the roller 51. This comprises a train of damping rollers driven by the roller 51 and terminating in a damping roller 52 in contact with the printing plate. The penultimate damping roller 53 of the damp train is essentially similar to the roller shown in FIGS. 6 and 7 in that it includes a similar pad (not shown) consisting a monitoring zone, in its surface, comprising a pair of electrodes spaced by electrically insulating material. As before the electrodes constitute a part of a damp measuring device which may be of the type shown in FIG. 5. The device produces a signal in dependence on the amount of water present on the roller 53 and hence in dependence on the amount present on the printer plate. The signal from the device is fed into an amplifier 55. There is also provided a means 56 of generating a reference signal dependent upon the amount of water which it is desired to be present on the printing plate. This reference signal is also fed into the amplifier 55. The amplifier 55 compares the signals and causes a motor control unit 57 to vary the speed of a motor 58 driving a roller of the damp train in dependence upon the difference in signals so that should the device indicate too little water is present on the roller 53 (and hence on the printing plate) then the speed of the motor 58 is adjusted so that more damp is applied by the damp train rollers, and vice-versa.

The machine also includes a means of applying ink to the printing plate on the printing roller 51. This means comprises an inking roller 59 and a train of rollers to feed ink to the inking roller 59. The ink roller train includes rollers 60 and 61, the remainder of the ink train rollers being omitted in the interests of clarity. The roller 60 is driven by a variable speed motor 62. A control unit 63 is provided to regulate the speed of the motor 62. Ink is applied to the inking roller 59 by the ink train rollers via an electrically conductive roller 64 in contact with the inking roller 59. A device 65 for measuring the thickness of the ink on the roller 64 is provided. This device is of the type described in our co-pending U.S. Pat. application Ser. No. 275109 and includes a coil effectively supported by a cushion of gas at a constant distance from the surface of the ink film on the roller 64 and hence at a distance, from the surface of the roller 64, which varies in dependence on the thickness of the ink film. This variation in distance produces a change in inductance of the coil and thus the inductance is a measure of the ink film thickness. The printing machine includes a means operably connecting the device 65 with the control unit 63 to cause the control unit 63 to regulate the speed of the motor 62 in dependence upon the amount of ink present on the roller 64 (and hence on the printing plate of the roller 51) as determined by the device 65. This means comprises an amplifier 66 and a means 67 of transmitting a reference signal to the amplifier 66. The reference signal is set so that the thickness of the ink film on the roller 64 is such that the ink film thickness on the printing plate is as desired. The amplifier 66 receives a signal from the device 65 which is dependent upon the thickness of the ink film on the roller 64 and compares this signal with the reference signal from means 67. The amplifier 66 then causes the control unit 63 to vary the speed of the motor 62 in dependence upon the difference between the signals so that should the device 65 indicate that too little ink is present the speed of the motor 62 is adjusted so that more ink is applied by the ink train rollers and vice-versa. Thus, in accordance with this embodiment, both the amount of ink and the amount of water present on the printing surface during printing are continuously monitored and the amounts of water and ink subsequently applied are automatically controlled in accordance with the monitored values.

In the embodiments described above, separate mechanisms are used to apply water and ink to the printing roller. The present invention is, however, equally applicable to combined water/ink systems as used in the smaller-office-type printing machines wherein a single group of rollers effects the application of both water and ink.

We claim:

1. A lithographic printing machine comprising
   i. a printing roller,
   ii. a lithographic printing plate having opposite ends and mounted on the printing roller to form a gap between the opposite ends, the printing plate having a surface including water-receptive areas and ink-receptive areas,
   iii. a means of applying water to the water-receptive areas of the surface of the printing plate,
   iv. a pad located on the printing roller in the gap to receive water from the water applying means, the pad including a surface in which is mounted a pair of electrodes spaced by electrically insulating material,
   v. terminals on the printing roller for electrical contact with the electrodes,
   vi. a means connected to the terminals, for measuring electrical resistance and,
   vii. a means of applying ink to the ink-receptive areas of the surface of the printing plate.

2. A lithographic printing machine comprising
   i. a printing roller for carrying a lithographic printing plate,
   ii. a lithographic printing plate on said printing roller,
   iii. means for applying water to water-receptive areas of the surface of said lithographic printing plate,
   iv. means for applying ink to ink-receptive areas of the surface of said lithographic printing plate,
   v. a monitoring zone comprising a surface in which is mounted a pair of electrodes spaced by electrically insulating material, which said pair of electrodes constitutes part of a damp measuring device, said monitoring zone being located in a water-receptive area of the printing plate so as to receive water from the water applying means, and
   vi. means for measuring the electrical resistance between said electrodes, said printing roller being provided with terminals in electrical contact with the electrodes of said monitoring zone, and said terminals being electrically connected to said means for measuring the electrical resistance.

* * * * *